Patented Feb. 25, 1947

2,416,434

UNITED STATES PATENT OFFICE 2,416,434

SULFUR-CONTAINING POLYMERS AND THEIR PREPARATION

William J. Burke, Marshallton, Del., assignor to E. I. du Pont de Nemours & Company, Wilmington, Del., a corporation of Delaware No Drawing. Application October 14, 1944, Serial No. 558,727

19 Claims. (Cl. 260—768)

1

This invention relates to new sulfur-containing polymers.

An object of this invention is to provide new polymeric products of the general formula $RSCH_2X$, wherein R is the residue of a linear, organic solvent-soluble polymer, X is a radical of the group consisting of —OR′, —SR′ and N—R′COR″, in which R′ is a monovalent organic radical and R″ is a member of the group consisting of hydrogen atoms and monovalent organic radicals. Another object is to provide new organic solvent-soluble polymeric products having the general formula $RSCH_2X$, wherein R is the residue of an organic solvent-soluble, linear polymer, X is a radical of the group consisting of —OR′, —SR′ and N—R′COR″, in which R′ is a lower alkyl group and R″ is a member of the group consisting of hydrogen atoms and lower alkyl groups. A still further object is to provide new alkoxymethylmercapto derivatives from natural rubber. Still another object is to provide a method for obtaining said polymeric products. Additional objects will become apparent from an examination of the following description and claims.

These and other objects and advantages are accomplished according to the hereindescribed invention which broadly comprises reacting a linear, organic solvent-soluble, polymeric thioacylate with formaldehyde and a monomeric, active hydrogen-containing organic compound in the presence of an acidic compound as catalyst.

One preferred embodiment of this invention comprises reacting a benzene solution of a rubber thioacetate with formaldehyde and methanol in the presence of a strong acid as catalyst.

Another preferred embodiment comprises reacting a benzene solution of rubber thioacetate with formaldehyde and a N-alkylamide in the presence of a strong acid as a catalyst.

By the term "acidic compound," as employed herein and in the appended claims, is meant a compound which, when admixed with water, produces a solution having a pH of less than 7.

By the term "strong acid," as used herein and in the appended claims, is meant a water-soluble acid having a dissociation constant greater than $1 \times 10^{-2}$.

By the term "polymer" as employed herein and in the appended claims, is meant a macromolecular organic compound containing a plurality of recurring units which are joined together in a chain-like manner.

By the term "active hydrogen-containing compound," as used herein and in the appended claims, is meant a compound selected from the group consisting of monohydric alcohols, monothiols and monoamides of monocarboxylic acids, said compound giving a positive reaction for active hydrogen by the Zerewitinoff Test (Ber. 40, 2023 (1907); ibid 41, 2236 (1908)).

By the term "polymeric thioacylate," as employed herein and in the appended claims, is meant the product obtained by reacting an organic solvent-soluble, polymeric polyunsaturated organic substance with a monocarbothiolic acid as described in the copending applications of W. J. Burke, Serial No. 503,417, filed September 22, 1943 and of Lawrence M. Richards Serial No. 515,807, filed December 27, 1943.

By "monocarbothiolic acid" is meant an acid of the general formula RCOSH, wherein R is a monovalent radical of the group consisting of alkyl and aryl radicals.

The following examples, in which proportions are in parts by weight unless otherwise specified, are given for illustrative purposes and are not intended to place any restrictions on the herein described invention.

Example I

Rubber thioacetate is prepared by reacting 68 parts of rubber with 114 parts of ethanethiolic acid (1.5 mole/isoprene unit) in 160 parts of benzene at room temperature for 6 days in the presence of air. The product is precipitated by drowning in methanol and the precipitate is washed with methanol until it is free of uncombined ethanethiolic acid. The resulting soft, light-colored product contains 17.85% sulfur, which corresponds to addition of ethanethiolic acid to 66% of the double bonds originally present in the rubber.

To 8 parts of the rubber thioacetate, prepared as described above, dissolved in 16 parts of benzene, is added a solution prepared by dissolving 9 parts of paraformaldehyde in 16 parts of methanol containing 0.005 part of sodium hydroxide and diluting with 16 parts of benzene. Dry hydrogen chloride gas is bubbled through the solution slowly for a few minutes and an additional 24 parts of benzene is added. The reaction mixture is heated under reflux for 2 hours, cooled to room temperature, allowed to stand for 18 hours, filtered to remove a small amount of insoluble material, and then drowned in a methanol-solid carbon dioxide mixture. The soft, light-colored solid thus obtained is washed thoroughly with alcohol and dried in a vacuum desiccator. The product contains 11.32% methoxyl (CH₃O) and 18.11% sulfur, which corresponds to the presence of 0.65 CH₃O/S, or stated differently, replacement of 65% of the acetylmercapto groups with methoxymethylmercapto groups. The reactions which occur during the conversion of the thioacyl group to the methoxymethyl group may be represented by the following equations:

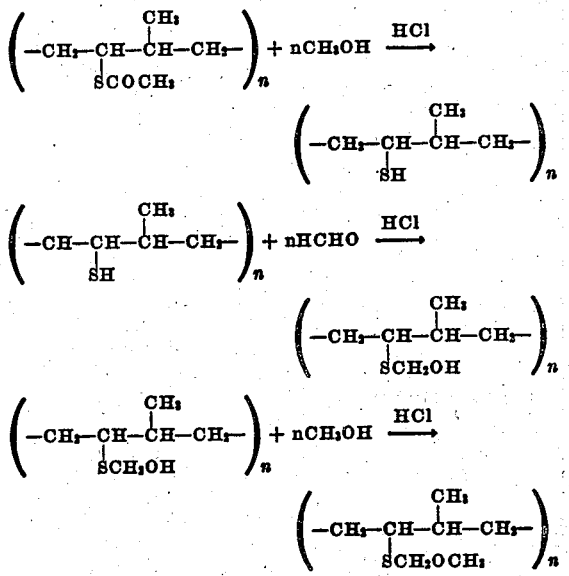

The product prepared as described above is soluble in dioxane and in aromatic hydrocarbon and chlorinated hydrocarbon solvents. Films cast from benzene solution are clear and pliable.

However, since the product still contains thioacyl groups, it may be rendered insoluble in organic solvents by alkaline hydrolysis followed by oxidation, e. g. exposure to air, of the hydrolysis product, as represented by the equations shown below.

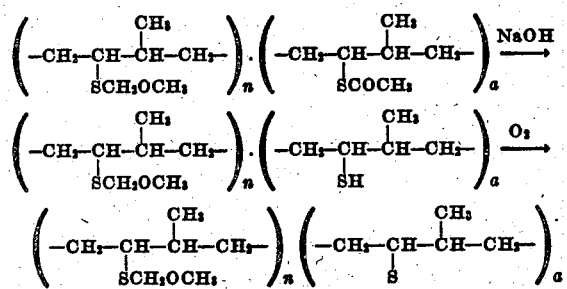

*Example II*

To 60 parts of the thioacetate of rubber, prepared essentially as described in Example I, and containing 19.72% sulfur, which corresponds to the addition of ethanethiolic acid to 79% of the double bonds originally present in the rubber, dissolved in 120 parts of benzene under nitrogen is added 24 parts of a methanol solution containing 1.5 parts of sodium methylate. After 20 minutes at room temperature, there is added to the reaction mixture a solution obtained by warming a mixture of 100 parts of isobutylformamide (1 mole), 27 parts of paraformaldehyde (0.9 mole) and 0.3 part of a 10% solution of potassium hydroxide in methanol. After the paraformaldehyde has dissolved there is added 24 parts of a 5% solution of paratoluene-sulfonic acid in acetic acid. The resultant acidified reaction mixture is kept at room temperature for 1 hour and then added to a methanol-solid carbon dioxide mixture in order to precipitate the product. The resulting soft solid is washed several times with fresh methanol, dissolved in 160 parts of acetone, precipitated in a methanol-solid carbon dioxide mixture and washed thoroughly with methanol. The product obtained contains 21.9% sulfur and 0.25% nitrogen, which corresponds to the replacement of about 3% of the thioacetate groups with N-isobutylformamidomethylmercapto substituents.

As illustrated by the examples, the compositions of the present invention are had by reacting an organic solvent-soluble polymeric thioacylate with formaldehyde and an active hydrogen-containing compound in a homogeneous system under acid conditions.

Any organic solvent-soluble polymeric thioacylate may be used in the practice of this invention. Furthermore, the corresponding thiols can be used. Of course, it is to be understood that by "corresponding thiol" is meant the thiol had by replacing the thioacyl groups of a polymeric thioacylate with thiol groups. For practical reasons it is preferred to employ the polymeric thioacylate rather than the corresponding thiol in the practice of this invention since the thioacylates are stable in the presence of air and in their use no special procedures are required to obtain the desired products of formula RSCH₂X, as hereinbefore defined.

Polymeric thioacylates useful in the practice of this invention are conveniently made by the methods described in the copending application of William J. Burke, Serial No. 503,417, filed September 22, 1943, and that of Lawrence M. Richards, Serial No. 515,807, filed December 27, 1943. These include the thiols and thioacylates of the polymers derived from butadiene-1,3, allene, isoprene, vinyl cyclohexene, cyclopentadiene, 1,2-bis-(vinyloxy)ethane, divinyl formal, divinyl acetal, divinyl sulfide and the like; unsaturated condensation polymers such as the polyesters, e. g., the reaction products of polyhydric alcohols with polycarboxylic acids, polyethers, polysulfides, polyamide-polyesters, polyacetals, etc., prepared from components at least one of which contains at least one olefin double bond; unsaturated alcohol-modified urea-formaldehyde, melamine-formaldehyde, and phenol-formaldehyde polymers; unsaturated derivatives of such film-forming polymers as starch, polyvinyl alcohol, casein, etc., partially polymerized drying oils, e. g., heat-bodied linseed oil and heat-bodied China-wood oil, etc.; the linear diene polymers obtained by polymerizing diene hydrocarbons in admixture with one another or in admixture with other polymerizable organic compounds. Examples of such dienes are butadiene-1,3, isoprene, dimethyl-2,3-butadiene-1,3 and the like. Examples of unsaturated organic compounds which can be polymerized with the above dienes are styrene, pinene, isobutylene, camphene, monovinylacetylene, etc., vinylethinyl alkyl carbinols, vinyl acetate, vinyl chloride, unsaturated aldehydes and ketones such as acrolein, methyl vinyl ketone, etc., acrylic and methacrylic acids and their esters, amides, imides, and nitriles, e. g., butyl acrylate, methyl methacrylate, acrylonitrile, methacrylonitrile, etc., alpha-chloroacrylic acid and its esters, e. g., methyl alpha-chloroacrylate, octyl alpha-chloroacrylate, etc., furyl acrylic acid and its esters, e. g., methyl furyl acrylate, etc., esters of 1,4-butenedioic acids, e. g., dimethyl fumarate, dimethyl maleate, etc. In place of the synthetic polymers there can be used naturally occurring unsaturated polymers, e. g., natural rubber, gutta percha, etc.

Polymeric thioacylates prepared by reaction of a carbothiolic acid with a polymeric N-oxymethylcarbonamide, as described in the copending application of W. J. Burke, Serial No. 524,623, filed March 1, 1944, and the corresponding polythiols can also be used in this invention. Specific types of polymeric thioacylates and particularly thioacetates include those prepared in this manner from the N-alkoxymethyl, or N-hydroxymethyl derivatives of polyamides, such as hexamethylene adipamide and decamethylene sebacamide, polyesteramides such as hexamethylene sebacate adipamide, urea-formaldehyde resins including alcohol modified products, etc.

Suitable polymeric thioacylates also include those prepared by reacting carbothiolic acids, particularly ethanethiolic acid, with organic solvent-soluble, high molecular weight polymers having ethylenically unsaturated side chains attached to the main polymer chain through oxygen. The preparation of these products and the corresponding polythiols described in the copending application of W. J. Burke, Serial No. 525,093, filed March 4, 1944. Specific suitable polymeric thioacetates include those prepared by the above process from crotyl cellulose, crotyl ethyl cellulose, crotyl methyl starch, allyl ethyl starch, methallyl ethers of polyvinyl alcohol, N-allyloxypolyhexamethylene adipamide, and mixed acetals of polyvinyl alcohol with butyraldehyde and acrolein.

Products derived from polymeric thioacetates, or the corresponding thiols, having a hydrocarbon polymer chain are preferred since they are readily prepared without substantial degradation or undesirable side reactions taking place. Products derived from these polymers and alcohols are particularly preferred for the same reasons.

While this invention has been illustrated with particular reference to the use of methanol and N-isobutylformamide as active hydrogen-containing compounds, it is to be understood that any active hydrogen-containing organic compound as hereinbefore defined is operative therein. Included among examples of active hydrogen-containing organic compounds contemplated for use in this process are monomeric compounds which contain hydrogen directly attached to an oxygen, nitrogen or sulfur atom and which are members of the group of alcohols, monothiols and monamides, e. g., alcohols, such as methanol, isopropyl alcohol, tertiary butyl alcohol, octanol, ethylene chlorohydrin, dimethylaminoethanol hydrochloride, N-ethyl-N-hydroxyethyl formamide, lactic acid, methyl hydroxyacetate, and the like; thiols, such as ethanethiol, butanethiol, paranitrobenzyl mercaptan, cyclohexyl mercaptan, 2-mercaptothiazoline, mercaptoacetic acid, ethyl mercapto acetate, etc.; monamides, such as those derived from monocarboxylic acids and which contain at least one hydrogen attached to amidonitrogen, e. g., acetamide, caprolactam, chloroacetamide, benzamide, acetanilide, stearamide and the like.

Compounds containing two or more active hydrogens in the form of hydroxyl or mercapto groups can also be used and examples are 2-mercaptoethanol, ethylene glycol, etc. Their use makes possible the formation of crosslinked products under certain conditions and this, of course, operates to limit their utility.

In place of the paraformaldehyde disclosed in the examples, there may be employed gaseous formaldehyde itself, or other formaldehyde-producing compounds, e. g. trioxane.

Methylol compounds such as 2(hydroxymethyl-mercapto)-thiazoline, and N(hydromethyl)benzamide can be used in place of formaldehyde and the active-hydrogen containing compound.

In the practice of this invention, generally, it is desirable to use at least one mole each of formaldehyde and active hydrogen compound per gram atom of sulfur present as a constituent of a thiol or thioacylate group. If only a small amount of modification is desired for some specific purpose, smaller quantities of the monomeric reactants can be used. A 1 to 10 mole or greater excess of the monomeric reagents is often used in order to reduce reaction time and to insure complete reaction when this is desired. It is generally preferred that the mole ratio of active hydrogen component to formaldehyde be at least 1 to 1. This is particularly true when soluble products free of crosslinks are desired.

It is to be understood that the reaction of the present invention must be effected in the presence of an acidic compound as catalyst. While appreciable effects are had with any acidic compound, substantially improved yields ordinarily result when a strong acid is used as catalyst. Included among examples of strong acids are: hydrochloric acid, paratoluenesulfonic acid, phosphoric acid, sulfuric acid and the like.

The process is generally operated at temperatures which range from 25° to 100° C. Temperatures up to decomposition temperature of the reactants or products can be used, if desired. The use of temperatures below 100° C. is particularly desirable where soluble products are required.

In general the reaction is complete in 1 to 48 hours but longer time can be used if needed.

Although the process is usually operated in the presence of an inert organic solvent, the use of such a solvent is not essential. In certain instances the active hydrogen-containing compound can function both as a reactant and as a solvent. The choice of inert solvent depends primarily on the particular polymer used. For example, with rubber thioacetate containing 19 to 22% sulfur, dioxane is a suitable solvent, but with rubber thioacetate having 3-10% sulfur, benzene is much more suitable. With a more polar type of polymer such as N-(acetylthiomethyl)hexamethylene adipamide, acetic acid can be used with advantage, particularly with thiols and amides. With products such as N-acetylthiomethylhexamethylene sebacamide an excess of a lower aliphatic alcohol can be used both as a reactant and as a solvent. Other suitable solvents include benzene, toluene, xylene and other aromatic hydrocarbons, trichloroethylene, methylene chloride and the chlorinated aliphatic hydrocarbons, and ethers, such as 1,2-dimethoxyethane, dioxane, and diethyl ether.

It is preferable to carry out the reaction in a homogeneous system since reaction of the solid polyacylates or polythiols with formaldehyde, active-hydrogen-compound and catalysts results in superficially crosslinked products whose utility is limited.

As hereinbefore stated, the novel products of this invention are polymeric products having the general formula RSCH$_2$X, wherein R is the residue of a linear, organic solvent-soluble polymer and X is a monovalent organic radical of the group consisting of radicals having the general formulae —OR', —SR' and $$-\underset{R'}{N}-COR''$$

wherein R' is a monovalent organic radical and R" is a member of the group consisting of hydrogen atoms and monovalent organic radicals. Compounds having the aforementioned general formula are obtained by reacting a linear, organic solvent-soluble polymeric thioacylate with formaldehyde and a monomeric active hydrogen-containing organic compound in the presence of an acidic compound as catalyst. Thus, reaction of a rubber thioacetate with formaldehyde and the following active hydrogen-containing organic compounds in the presence of an acidic compound as catalyst provides products containing the characteristic units shown in the table below.

| Active hydrogen-containing compound | Characteristic unit in product |
|---|---|
| C₄H₉OH<br>Butanol | $\left(-CH_2CH-\underset{SCH_2OC_4H_9}{\overset{CH_3}{\underset{|}{C}}H}-CH_2-\right)$ |
| ClCH₂CH₂OH<br>Ethylene chlorohydrin | $\left(-CH_2-CH-\underset{SCH_2OCH_2CH_2Cl}{\overset{CH_3}{\underset{|}{C}}H}-CH_2-\right)$ |
| 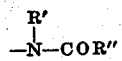<br>2-mercaptothiazoline | $\left[-CH_2-CH-\underset{SCH_2SC}{\overset{CH_3}{\underset{|}{C}}H}-CH_2- \overset{N-CH_2}{\underset{S-CH_2}{\diagup\diagdown}}\right]$ |
| C₆H₅CONH₂<br>Benzamide | $\left(-CH_2-CH-\underset{SCH_2NHCOC_6H_5}{\overset{CH_3}{\underset{|}{C}}H}-CH_2-\right)$ |
| C₁₂H₂₅SH<br>Dodecanethiol | $\left(-CH_2-CH-\underset{SCH_2SC_{12}H_{25}}{\overset{CH_3}{\underset{|}{C}}H}-CH_2-\right)$ |

Similarly by using a butadiene-styrene interpolymer thioacetate in place of the aforementioned rubber thioacetate, there are obtained products which contain the characteristic structural units shown below.

| Active hydrogen-containing compound | Characteristic structural unit |
|---|---|
| HSCH₂COOH<br>Mercaptoacetic acid | $\left(-CH_2-CH-CH_2-\underset{SCH_2SCH_2COOH}{\overset{C_6H_5}{\underset{|}{C}}H}-CH_2-\right)$ |
| <br>N-methyl-N-hydroxyethyl<br>(acetamide) | $\left[-CH_2-CH-CH_2-CH_2-\underset{\underset{CH_3}{\overset{|}{N}-COCH_3}}{\overset{C_6H_5}{\underset{|}{C}}H}-CH_2-\right]$ |
| HOCH₂COOH<br>Hydroxyacetic acid | $\left(-CH_2-CH-CH_2-\underset{SCH_2OCH_2COOH}{\overset{C_6H_5}{\underset{|}{C}}H}-CH_2-\right)$ |
| C₆H₅CH₂OH<br>Benzyl alcohol | $\left(-CH_2-CH-CH_2-\underset{SCH_2OCH_2C_6H_5}{\overset{C_6H_5}{\underset{|}{C}}H}-CH_2-\right)$ |

The products of this invention are useful in the preparation of pellicles, fibers, coating compositions and the like.

As many apparently widely different embodiments of this invention may be made without departing from the spirit and scope thereof, it is to be understood that I do not limit myself to the specific embodiments thereof except as defined in the appended claims.

Having described the present invention, the following is claimed as new and useful:

1. A polymeric product having the general formula RSCH₂X, wherein R is the residue of a rubber-like polymer of a diolefin and X is a monovalent organic radical of the group consisting of radicals having the general formulae —OR', —SR' and $$-\underset{R'}{N}-COR''$$

wherein R' is a lower alkyl group and R" is a member of the group consisting of hydrogen atoms and monovalent lower alkyl groups.

2. A polymeric product having the general formula RSCH₂OR', wherein R is the residue of a rubber-like polydiolefine and R' is a monovalent lower alkyl group.

3. A polymeric product having the general formula RSCH₂OCH₃, wherein R is the residue of a rubber-like polydiolefine.

4. A polymeric product having the general formula

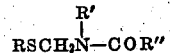

wherein R is the residue of a rubber-like polydiolefine, R' is a monovalent lower alkyl group and R" is a member of the group consisting of hydrogen atoms and monovalent lower alkyl groups.

5. A polymeric product having the general formula

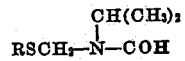

wherein R is the residue of a rubber-like polydiolefine.

6. The process for obtaining a polymeric product having the general formula RSCH₂X, wherein R is the residue of a rubber-like polymer of a diolefin and X is a monovalent organic radical of the group consisting of radicals having the general formulae —OR', —SR' and $$-\underset{\underset{R'}{|}}{N}-COR''$$

wherein R' is a lower alkyl group and R'' is a member of the group consisting of hydrogen atoms and monovalent lower alkyl groups, which comprises reacting a thioacylate of a rubber-like polymer of a diolefin with formaldehyde and a monomeric, active hydrogen-containing organic compound in the presence of an acidic compound as catalyst.

7. The process according to claim 6 wherein at least one mole each of formaldehyde and active hydrogen-containing compound are employed per mole of polymeric thioacylate and the mole ratio of active hydrogen-containing organic compound to formaldehyde is at least 1/1.

8. The process for obtaining a polymeric product having the general formula RSCH₂OR', wherein R is the residue of a rubber-like polydiolefine and R' is a monovalent lower alkyl group, which comprises reacting a thioacylate of a rubber-like polydiolefine with formaldehyde and a lower aliphatic monohydric alcohol in the presence of a strong acid as catalyst.

9. The process for obtaining a polymeric product having the general formula RSCH₂OCH₃, wherein R is the residue of a rubber-like polydiolefine, which comprises reacting a benzene solution of a thioacetate of a rubber-like polydiolefine with formaldehyde and methanol in the presence of a strong acid as catalyst.

10. The process for obtaining a polymeric product having the general formula $$RSCH_2-\underset{\underset{R'}{|}}{N}-COR''$$

wherein R is the residue of a rubber-like polydiolfine, R' is a monovalent lower alkyl group and R'' is a member of the group consisting of hydrogen atoms and monovalent lower alkyl groups, which comprises reacting a thioacylate of a rubber-like polydiolefine with formaldehyde and an N-loweralkylamide in the presence of a strong acid as catalyst.

11. The process for obtaining a polymeric product having the general formula $$RSCH_2-\underset{\underset{CH(CH_3)_2}{|}}{N}-COH$$

wherein R is the residue of a rubber-like polydiolefine, which comprises reacting a benzene solution of a thioacetate of a rubber-like polydiolefine with formaldehyde and an N-isobutylforamide in the presence of a strong acid as catalyst.

12. A polymeric product having the general formula RSCH₂OR', wherein R is the residue of rubber and R' is a monovalent lower alkyl group.

13. A polymeric product having the general formula RSCH₂OCH₃, wherein R is the residue of rubber.

14. A polymeric product having the general formula $$RSCH_2-\underset{\underset{R'}{|}}{N}-COR''$$

wherein R is the residue of rubber, R' is a monovalent lower alkyl group, and R'' is a member of the group consisting of hydrogen atoms and monovalent lower alkyl groups.

15. A polymeric product having the general formula $$RSCH_2-\underset{\underset{CH(CH_3)_2}{|}}{N}-COH$$

wherein R is the residue of rubber.

16. The process for obtaining a polymeric product having the general formula RSCH₂OR', wherein R is the residue of rubber and R' is a monovalent lower alkyl group, which comprises reacting a thioacylate of rubber with formaldehyde and a lower aliphatic monohydric alcohol in the presence of a strong acid as catalyst.

17. The process for obtaining a polymeric product having the general formula RSCH₂OCH₃, wherein R is the residue of rubber, which comprises reacting a benzene solution of a thioacetate of rubber with formaldehyde and methanol in the presence of a strong acid as catalyst.

18. The process for obtaining a polymeric product having the general formula $$RSCH_2-\underset{\underset{R'}{|}}{N}-COR''$$

wherein R is the residue of rubber, R' is a monovalent lower alkyl group, and R'' is a member of the group consisting of hydrogen atoms and monovalent lower alkyl groups, which comprises reacting a thioacylate of rubber with formaldehyde and an N- lower alkylamide in the presence of a strong acid as catalyst.

19. The process for obtaining a polymeric product having the general formula $$RSCH_2-\underset{\underset{CH(CH_3)_2}{|}}{N}-COH$$

wherein R is the residue of rubber, which comprises reacting a benzene solution of a thioacetate of rubber with formaldehyde and an N-isobutyl formamide in the presence of a strong acid as catalyst.

WILLIAM J. BURKE.

REFERENCES CITED

The following references are of record in the file of this patent:

FOREIGN PATENTS

| Number | Country | Date |
|---|---|---|
| 514,535 | British Deut. Hydro. Akt. Ges. | Nov. 10, 1939 |
| 549,759 | German I. G. F. | Apr. 30, 1932 |